G. GORTON.
CUTTING-OFF MACHINE.
APPLICATION FILED MAY 7, 1912.

1,073,600.

Patented Sept. 23, 1913.
5 SHEETS—SHEET 1.

Witnesses
E. R. Peck
L. L. Burket

Inventor
George Gorton
By Arthur E. Peck, Attorney

G. GORTON.
CUTTING-OFF MACHINE.
APPLICATION FILED MAY 7, 1912.

1,073,600.

Patented Sept. 23, 1913.
5 SHEETS—SHEET 2.

G. GORTON.
CUTTING-OFF MACHINE.
APPLICATION FILED MAY 7, 1912.

1,073,600.

Patented Sept. 23, 1913.
5 SHEETS—SHEET 4.

UNITED STATES PATENT OFFICE.

GEORGE GORTON, OF RACINE, WISCONSIN.

CUTTING-OFF MACHINE.

1,073,600.  Specification of Letters Patent.  Patented Sept. 23, 1913.

Application filed May 7, 1912. Serial No. 695,794.

*To all whom it may concern:*

Be it known that I, GEORGE GORTON, a citizen of the United States, residing at Racine, in the county of Racine and State of Wisconsin, have invented certain new and useful Improvements in and Relating to Cutting-Off Machines, of which the following is a specification.

This invention relates to certain improvements in metal cutting off machines; and the objects and nature of the invention will be readily understood by those skilled in the art in the light of the following explanation of the accompanying drawing illustrating what I now believe to be the preferred embodiment from among other formations, arrangements, constructions and combinations within the spirit and scope of my invention.

An object of the invention is to provide improvements in construction of the cutter disk carrying drum and the mountings thereof or bearings therefor with the ends in view of attaining maximum durability, compactness, and quick, easy and accurate bearing adjustment.

A further object of the invention is to provide improvements in and relating to means employed for mounting and driving hollow rotary drums provided with and spanned by cutter disks having central work receiving openings with the ends in view of reducing the length of such drums, improving the bearings thereof, attaining maximum lubrication and consequent durability, and attaining accuracy in adjustment.

A further object of the invention is to provide certain improvements in arrangements of parts and in details of construction, whereby a highly efficient and improved cutting off machine cutting element and mounting therefor will be produced.

The invention consists in certain novel features of construction and in combinations and arrangements as more fully and particularly set forth and pointed out hereinafter.

Referring to the accompanying drawings: Fig. 4, is a section on the line 4—4, Fig. 1. Fig. 7, is a sectional view showing a different bearing adjustment.

In the drawings, I show an annular or ring-like case or box in which the hollow rotary drum 1, is mounted and by which it is supported. The cutter disk 2, is secured to one end of this drum and is driven by and spans the drum, and is provided with a central work receiving opening 20, surrounded by suitable cutters 21, diagrammatically indicated in the drawings. The drum is provided with an enlarged exterior driving gear 10, rigid with the drum and inclosed within said case, and meshing with and driven by a pinion 3, inclosed within the case and driven by a pinion shaft 30, mounted in the edge portion of the case beyond the gear 10, and usually extending transversely through the case. Suitable means, not shown, are provided for driving said pinion shaft.

In a cutting off machine, the case carrying the drum 1, usually constitutes a feed carriage, provided with suitable feed works or mechanism, and suitably mounted in or on a suitable fixed base provided with one or more work or stock clamps or vises to hold the stock extending through the work receiving opening of the cutter disk, while the rotary disk operates thereon to sever the same as the carriage is moved in the base on its feed stroke. The case carrying said drum can be either fixed to the base, or mounted therein or thereon to swing or to reciprocate on the feed and return strokes. If the case is fixed, means will be provided to feed the work or stock being severed, and if the case is movable to constitute a feed carriage, the stock or work will be held fixed.

I do not herein show the base, feed mechanism, stock clamp or other holder, operating gearing, and means for mounting or supporting the case, as such elements do not form parts of my present invention.

In the specific example illustrated, the drum 1, is cast or otherwise formed integral or in one piece with the exterior driving gear 10, and said gear is formed with an enlarged rim having peripheral spur teeth, and connected with the drum by a suitable web arranged at a point approximately midway between the ends of the drum. The driving gear composed of the web, rim and teeth is not necessarily located at the center of the length of the drum but is preferably spaced from both the front and rear ends of the drum to leave exterior cylindrical or peripheral portions of the drum beyond opposite side faces of said gear.

In the form illustrated by Figs. 1 to 6, the vertical front end edge of the drum is formed with a depressed seat to receive the surrounding edge portion of the cutter disk 2, and this disk is removably clamped to the drum end by a clamping ring 22, removably fitting the front vertical face of the disk, and secured by removable machine screws 23, passing through the ring and disk and longitudinally into the drum. This ring, beyond the front end of the drum, is formed at its rear face with a surrounding liquid (water) receiving groove 24, and in front of said groove, with an annular projecting free liquid (water) slinging edge 25.

Figures 3, 8:
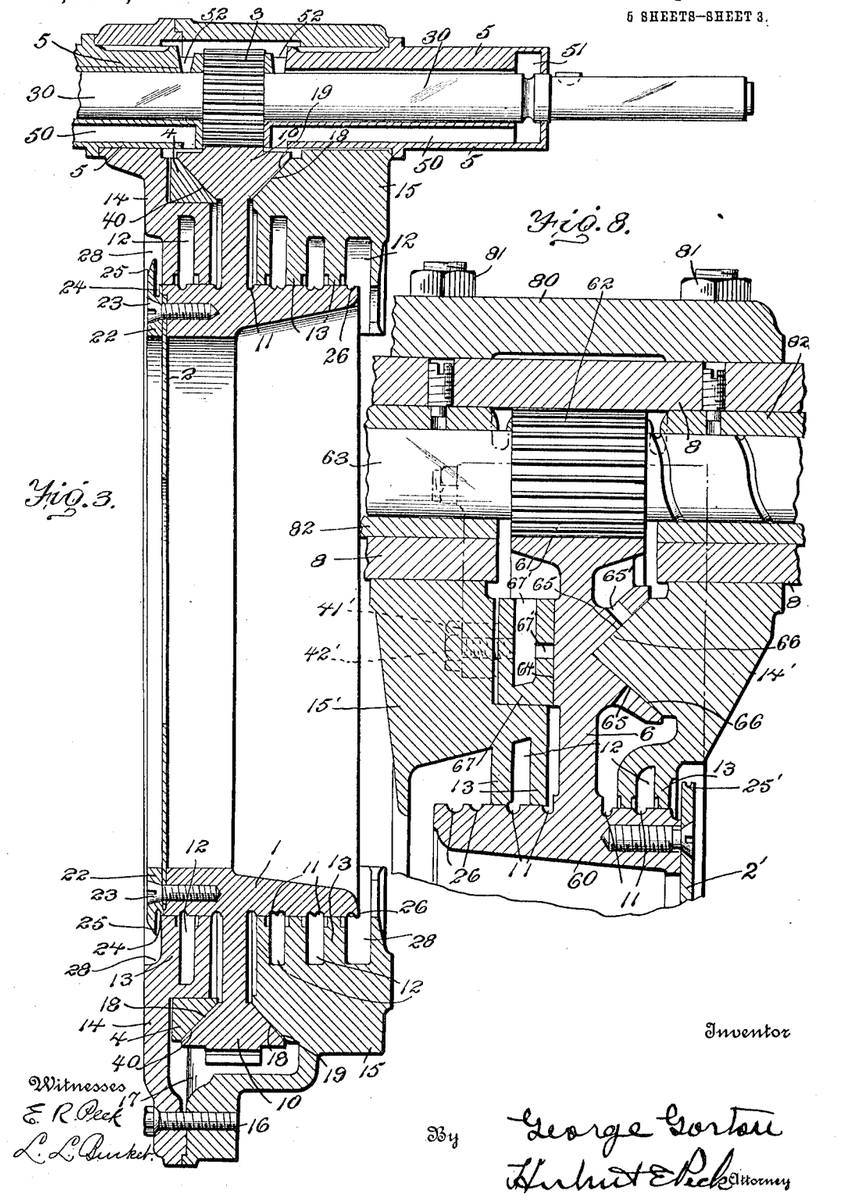
Fig. 3, is a section on the line 3—3, Fig. 1.
Figs. 8, 8$^a$, 9, 10, 11, 12, and 13, are sectional views through the box and drum, showing variously formed bearings and adjustments.

If so desired, and as shown in certain other figures of the drawings, the clamping ring 22 need not be employed, but the cutter disk 2′ can be removably secured by the screws 23, and the surrounding edge of the disk itself can be extended beyond the external diameter of the drum and beveled or sharpened or annularly grooved to form the projecting free water or other liquid slinging edge 25′, in front of the front end or face of the case or box as shown in Figs. 8, 8ᵃ, 9 and 10.

The rear end of the drum in rear of the rear face of the box or case is also provided with an exterior circumferential water or liquid annular groove and slinging edge 26. During the operation of the cutter disk, the cutters and the kerf in the work are flooded with suitable cooling liquid, such as soda water or the like, and this water is discharged from the disk and also runs through the drum and is discharged from the rear end thereof. It is exceedingly desirable in the operation of such cutting off machines, to be able to control the discharge of this liquid and prevent the same from working into the box or case and to the drum bearings. Hence the provision of the water receiving and slinging grooves and edges at the front and rear ends of the drum projecting beyond the portions of the case circumferentially fitting the drum. These grooves and edges collect the water and prevent the same working into the case, and cause the rapid centrifugal discharge of the same radially from the drum ends.

The front and rear ends of the case or box are extended forwardly and rearwardly beyond the portions thereof fitting the circumference of the drum, and the central openings thereof are preferably internally enlarged in diameter so that the inner walls of said box ends are spaced from and overhang the water receiving and slinging grooves and edges of the drum ends, to form annular recesses 28, to catch and receive the water thrown radially from said edges. These water catching recesses 28, are usually open at their lower portions to permit the water caught in said grooves or recesses to flow, or drop from the lower side of the case (see Figs. 1, 2, 3 and 4) into any suitable off take or receptacle, not shown. The box or case circumferentially fits around the exterior surface of the drum between the driving gear and the opposite end portions of the drum, and the drum is externally formed to coöperate with a peculiar internal formation of the case in retaining lubricating oil within the case and against leakage to the water slinging grooves 24, 26.

I show the drum exteriorly formed with circumferential parallel oil collecting and slinging grooves 11, while the case is formed with radially deep oil chambers, grooves or annular recesses 12, surrounding said grooves 11, so that the oil is thrown radially or centrifugally from the grooves 11, into said annular recesses 12. The portions of the case between the annular oil chambers 12, form annular inwardly extending ribs or flanges 13, at their inner edges fitting the cylindrical faces of the drum intervening between the grooves 11, and forming running joints in connection therewith against leakage of oil from the case and against leakage of the soda water or other cooling liquid into the case, as the film of oil which will form on each rib or flange 13, very effectively prevents water entering the oil chambers.

The box or case is composed of two vertical parallel annular or ring like sections 14, 15, fitting together at the inner side faces of their outer circumferential portions and rigidly secured to form the complete box or case by bolts or screws 16.

Figures 1, 5, 6:
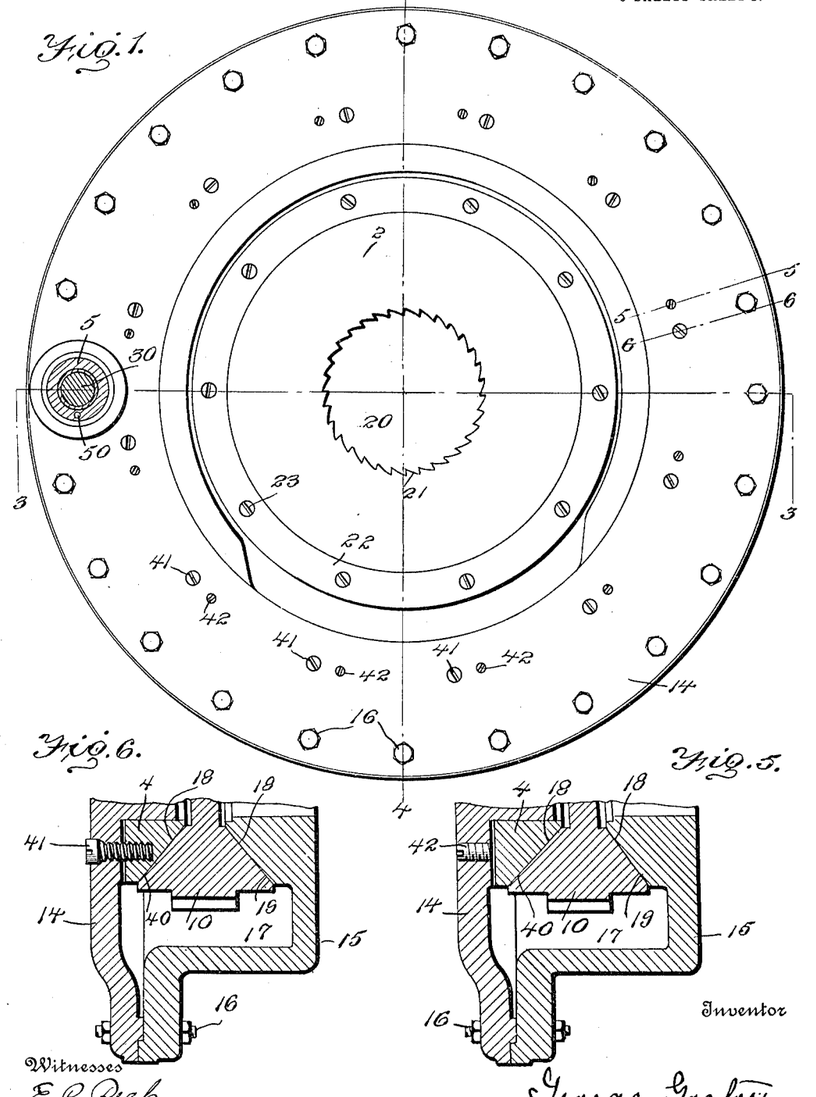
—Figure 1, is a front elevation of a portion of a cutting off machine, showing the cutter disk, and the box or case carrying the drum to which said disk is secured and by which the same is driven; the pinion shaft being shown in section, the base and means for mounting or supporting said case or box on or in the base and the actuating or operating transmission gearing and various other parts, not being shown.
Fig. 5, is a section on the line 5—5, Fig. 1.
Fig. 6, is a section on the line 6—6, Fig. 1.
Figure 2:
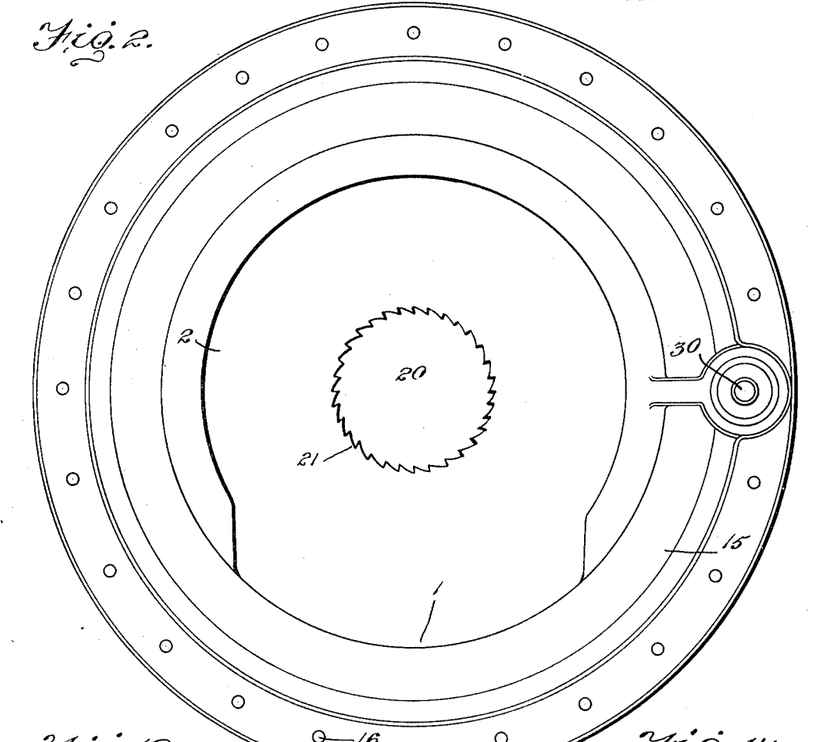
Fig. 2, is a rear elevation of the structure of Fig. 1.

In the specific example illustrated, typified by Fig. 1, the section 14, surrounds the end of the drum in front of the drive gear while the section 15, surrounds the drum in rear of the drive gear, while the outer portions of the box sections of greater diameter than the drive gear meet around and are spaced radially or a distance outwardly from the drive gear to form an annular chamber 17, in which said gear revolves and this chamber forms an oil receptacle so that the gear revolves in oil at least throughout a portion of its circle. The adjoining inner vertical faces of the two box sections 14, 15, are preferably so formed as not to contact with the opposite vertical side faces of the driving gear web and hence provide oil chambers or recesses 12, such as hereinbefore described beside said vertical faces of the gear web.

The box or case supports and carries the drum and forms the journal box thereof or provides a bearing therefor, however the real bearing for the drum is not around the cylindrical portion thereof but is non-cylindrical and is provided between side faces of the drive gear and corresponding annular internal portions of the box of greater diameter than the cylindrical faces of the box surrounding the circumferential portions of the drum.

In the specific example typified by Fig. 1, I show what might be termed cone bearings between opposite side faces of the driving gear and the box sections 14, 15. For instance, the rim of the driving gear is formed with corresponding opposite side face inclined or conical inwardly converging annular bearing faces 18, extending from the longitudinally enlarged or widened outer toothed or circumferential face of the rim inwardly to the web joining the rim to the drum so that the bearing faces 18, are spaced radially a distance from the cylindrical portion of the drum.

The box is internally formed with correspondingly formed inclined or conical annular bearing faces to receive said faces 18, and said bearing faces of the box are arranged within or are surrounded by the oil chamber 17, of the case in which the toothed rim of the gear revolves.

I show the box section 15, formed with rigid conical or inclined annular bearing surface 19, to receive the rear surface 18, of the gear, while the inner side face of the box section 14, is annularly recessed to receive a laterally adjustable bearing ring 4, having its inner side face beveled to form an annular inclined or conical bearing surface 40, receiving and corresponding to the front bearing surface 18, of the gear.

The ring 4, is adjustable in a direction parallel with the axis of rotation of the drum to take up wear of the bearing faces 40, 18 and 19, and to tighten the bearing to the desired degree, and incidentally such adjustment of the bearing properly centers the drum in the box. Various means can be provided for adjusting the bearing ring and maintaining the same in the desired adjustment with the conical bearing surface 40, thereof absolutely concentric or parallel with the engaging surface 18, of the drum gear. For instance, adjusting screws 41, can be provided passing loosely through and turnable in the box section 14, and screwing into transverse threaded sockets in the bearing ring 4, so that the ring can be moved toward or from bearing surface 18, by rotating the screws in the proper direction. These screws have their heads suitably formed to receive the proper tool for turning the same and these heads can be countersunk if so desired.

In connection with the adjusting screws 41, I usually provide headless set or stop-forming screws 42, screwing through threaded holes in the box section and at their inner ends abutting against the outer vertical side face of the ring. The adjusting screws 41, are spaced apart and arranged in a circle about the ring and usually each adjusting screw has a stop screw 42, arranged adjacent thereto.

In adjusting the ring, the adjusting screws 41, are loosened up, and the set screws 42, are then tightened up uniformly about the ring, and finally the adjusting screws are tightened to pull the ring tightly against the set screws 42, and set the same in the desired accurate vertical position and allowing the necessary accurate looseness of or in the bearing.

Instead of providing the screws 41, 42, for bodily and uniformly adjusting the bearing ring horizontally or parallel with the drum axis, various other adjusting means might be employed. For instance, in Fig. 7, I show a construction wherein the vertical horizontally-slidable bearing ring 4', is backed and adjusted by a nut-forming ring 43, exteriorly threaded to mesh with the correspondingly threaded wall 44, of an annular socket in the box section 14ª. Rotation of this nut in one direction will force the bearing ring toward the drum bearing 18, while rotation in the opposite direction will permit bearing loosening movement of the bearing ring.

Figures 4, 7, 8A:
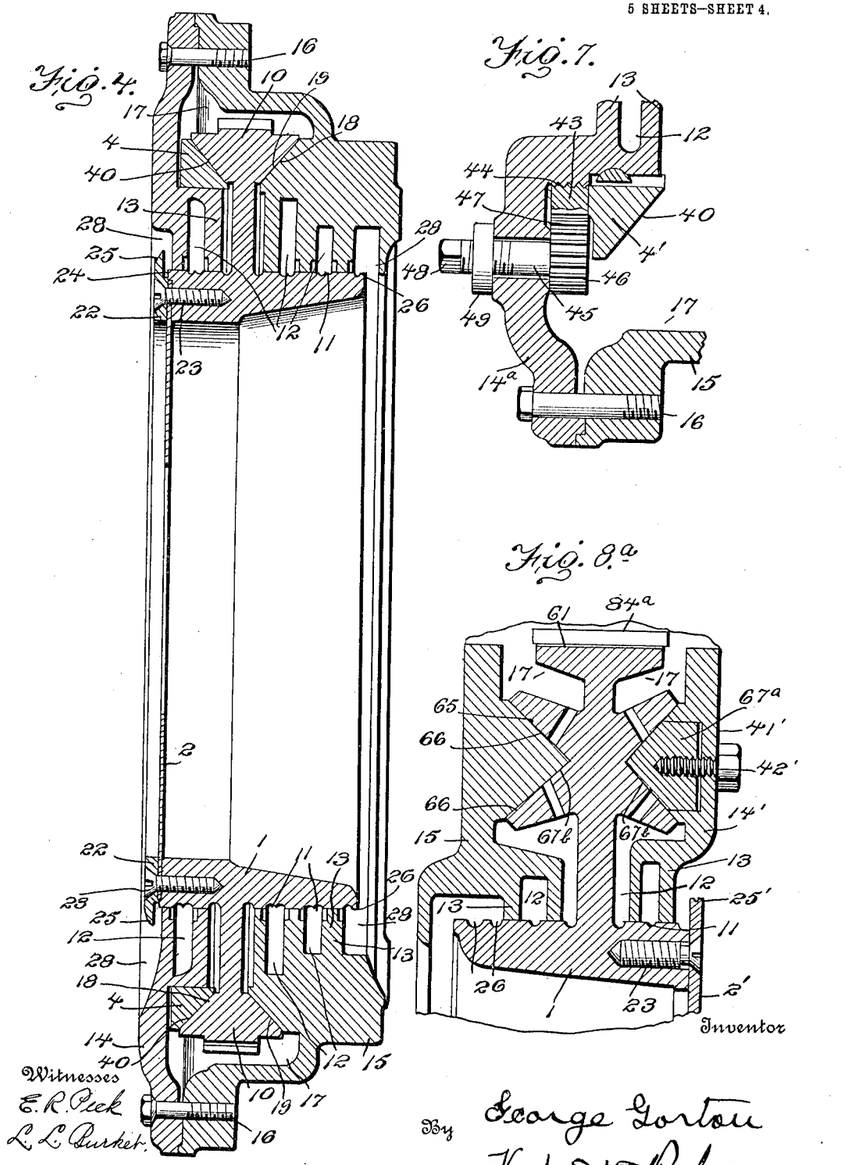

As a means for rotating this nut and holding the same in the desired position, I show a rotary shaft 45 mounted in the box section and at its inner end provided with a pinion 46, meshing with teeth 47, formed around the inner surface of the nut 43. The outer end 48 of this shaft is arranged at the exterior of the box and is formed to receive and be rotated by a wrench or other implement.

The exterior portion of the shaft can be provided with a longitudinal thread on which a jam nut 49, is located. The shaft can be locked against movement by tightening up this nut against the outer surface of the box.

In the example typified by the construction of Fig. 1, the box sections 14, 15, are formed at their edge portions beyond the circle of the gear teeth of the drum driving gear, with alined transverse openings to receive the pinion shaft bearings, and said box sections are somewhat enlarged adjacent to said shaft to receive said bearings. In said example the pinion shaft is mounted in sleeves or bushings 5, inserted and fixed in said openings and spaced apart at their inner ends to receive the pinion 3, and the drum gear teeth between their end edges. These bushings are preferably formed at their inner faces with suitable oil grooves for distribution of oil to the pinion shaft. Each bushing is shown provided with a longitudinal oil return duct or passage 50, from an annular oil groove 51, around and open to the shaft at the outer end of the bearing. The inner end of the duct 50, opens radially at the lower portion of the exterior of the bushing to discharge the oil onto the rim of the drum driving gear beyond the end edges of the teeth and adjacent to the outer edge of one of the bearing faces 18.

At the top portions of their inner ends, the two bushings 5, are shown provided with oil pockets 52, at their inner ends open to the pinion shaft bearing and at their upper ends open to catch oil carried up by the pinion and overflowing from the ends thereof.

The drum gear moves in oil through a considerable portion of the circle of its travel and consequently carries a considerable quantity of oil up to the pinion and much of this oil is carried around with the pinion and overflows therefrom and is caught in the pockets 52, and delivered to the pinion shaft bearings. The surplus oil from the pinion bearings is delivered back to the drum bearings as described. The drum bearings at the faces of the drum driving gear are plentifully lubricated by the oil in the box, in fact the bearings at the lower portion of the gear are constantly immersed in oil.

My invention can be embodied in many forms of bearings. For instance, in Fig. 8, I show the annular web 6, (through and by which the drum 60 is driven by gear teeth 61, pinion 62, and its shaft 63,) formed at one side face with an annular vertical flat bearing face 64, and on the other side with an annular V-groove forming two outwardly diverging conical bearing faces 65. The box section 14', is formed at its inner side face with an annular rib V-shaped in cross section to fit in said V-groove and provide converging conical flat bearing faces 66, for the faces 65. Adjustment is provided for by a flat adjustable bearing ring 67, carried by the other box section 15', and held and adjusted by adjusting and set screws 41', 42', and providing a flat vertical annular bearing face to engage the rotating surface 64. The conical bearing surfaces 65, and 66, center the drum and receive the radial thrust and constantly maintain the desired uniform engagement completely around the circle of the bearing even after repeated adjustment due to wear. The desired adjustment of the bearing can be maintained by the ring 67, and its adjusting means.

Free and bountiful lubrication can be easily provided for by reason of the inclosure of the drum and its gear in the oil containing receptacle so that oil is carried around by the gear, and the location of the main bearing of the drum near the periphery of the drum driving gear.

I show the ring 67, formed with open top oil pockets 67', to catch oil dropped from the gear rim and having one or more lateral oil ducts 67'', to the bearing surface 64. Oil pockets and ducts 65', can be provided leading to the surfaces 65, 66. These pockets are spaced around the gear and pick up and carry around oil and pass the same to the main bearing.

It is obvious that the arrangement of Fig. 8, might be reversed by forming the drum gear web with the rib providing surfaces 66, and the box sections with the V-groove providing the surfaces 65.

Figure 9:
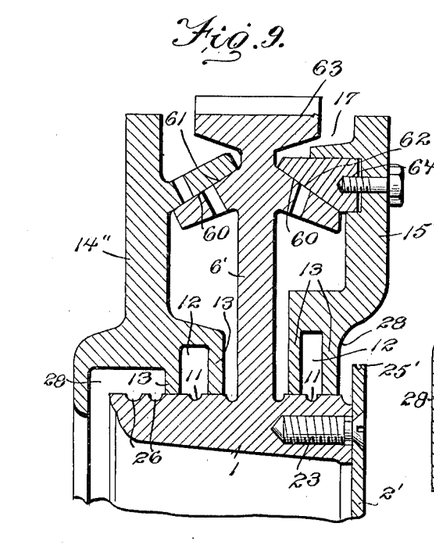

In Fig. 9, the gear web 6', is shown at its opposite side faces formed with flanges at their outer surfaces providing diverging or opposite conical annular bearing faces 60. The box is provided with opposing bearing faces 61, 62, between the same and the tooth rim 63, of the drum driving gear. The annular conical surface 61, is formed by a rigid flange of the box section 14'', while the surface 62, is formed on an adjustable bearing ring 64, carried by the other box section 15''. This formation and arrangement will be readily understood by those skilled in the art, in the light of what has preceded herein.

Figure 10:
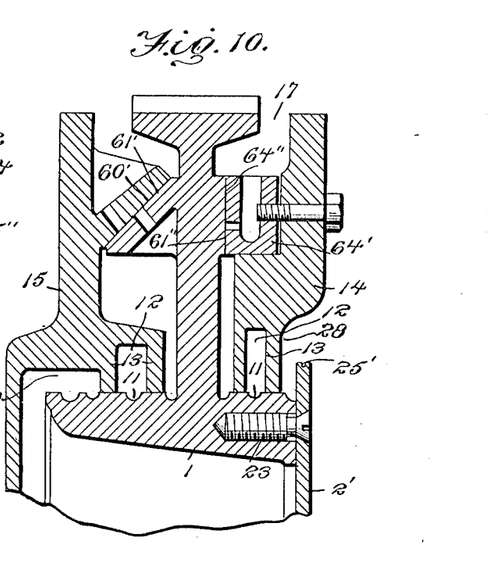

In the form illustrated by Fig. 10, the main bearing for the drum is formed by two conical annular bearing surfaces 60', 61', arranged at one side of the drum driving gear web, while adjustment is provided for by an adjustable bearing ring 64', at the opposite side of said ring having a flat vertical bearing face 64'', engaging a flat vertical face 61'', of the web. The formation on the left hand side of the web is the same as that on the left hand side of the web of Fig. 9.

Figure 11:
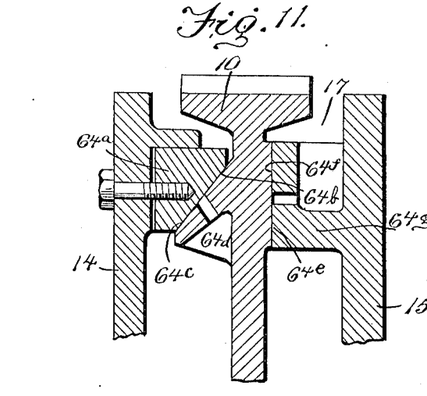

In Fig. 11, the main bearing for the drum is arranged on one side of the drum driving gear web and comprises an adjustable bearing ring 64$^a$, beveled to form an inwardly and laterally inclined or conical annular bearing face 64$^b$, surrounding and engaging the inclined or conical bearing face 64$^c$, of a lateral flange 64$^d$, rigid with the gear web. The opposite side of the gear web is formed with a flat vertical bearing face 64$^e$, engaging the flat vertical face 64$^f$, of a rib 64ᵍ, formed integral with the adjacent wall of the box.

Figure 12:
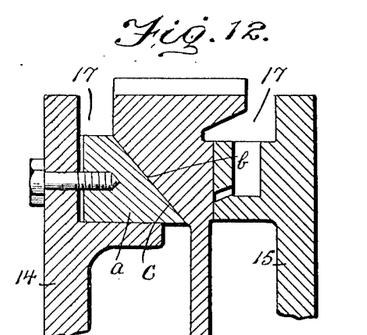

The construction illustrated by Fig. 12, is practically that disclosed by Fig. 11, with the exception that the conical bearing face b, of the adjustable bearing ring a, is virtually within or surrounded by the conical bearing face c, of the drum driving gear web.

Figure 13:
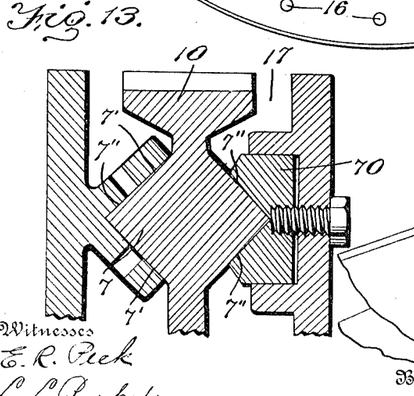

In the construction illustrated by Fig. 13, double main bearings are provided on both sides of the drum driving gear web. The gear web is provided at both side faces with similar annular ribs 7, V-shaped in cross section to provide each rib with opposite or inner and outer converging annular conical bearing surfaces 7', and the adjacent side walls of the box are provided with corresponding annular V grooves to receive these ribs, each groove providing annular converging conical bearing faces 7'' engaging the surfaces 7'. The groove and bearing faces 7 at one side of the gear web are formed in and by the adjacent casing wall, while the surfaces 7'', at the opposite side of the web are formed in the inner end of an adjustable bearing ring 70, provided with any suitable adjusting means, such as hereinbefore described.

Figure 14:
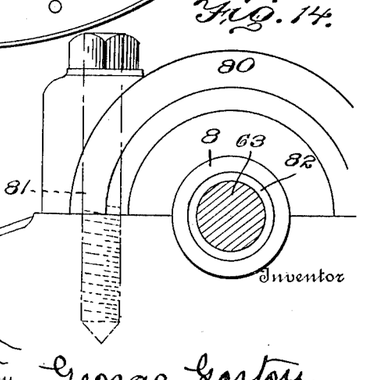
Fig. 14, is a side elevation of the portion of a case or box receiving the pinion shaft, the arrangement being somewhat different from that of Fig. 1.

Fig. 14, shows in elevation a portion of the case of the structure illustrated by Fig. 8, wherein the box sections have a transverse passage open at the top to receive a tube 8, clamped to both sections of the box by a cap 80, secured by bolts 81. This tube 8, contains the bushings 82, forming bearings for the pinion shaft 63, and incloses the pinion 62. The tube 82, is cut away at its under side to receive the gear teeth 61 of the drum driving gear and permit intermeshing thereof with the driving pinion.

While peculiar advantages are attained by forming the drum in one piece with its enlarged exterior driving gear, yet I do not wish to limit my invention to such formation, and while the provision of the main bearings for the drum located at one or both side faces of the drum driving gear is an important, if not the important object of this invention, yet I do not wish to limit all features of the invention thereto, as certain features of the invention are applicable where other forms of bearings are employed.

By arranging the main bearings for the drum elsewhere than about the cylindrical exterior thereof, I am enabled to make the drum of a minimum length and hence reduce the width of the complete machine, also I am thereby enabled to locate the work or stock clamps or vises nearer to the side faces of the cutting disk than has heretofore been possible. I also avoid the necessity of employing expensive bearings heretofore necessary to receive the cylindrical portions of the drum, and can cast the box sections and also the drum and its driving gear and produce an exceedingly durable and yet comparatively inexpensive structure. By employing the cone-like main bearings for the drum, bearing adjustment can be quickly and accurately accomplished and the annular bearing surfaces can be maintained in accurate engagement and alinement throughout the circles thereof, a result not possible of accomplishment where split journal boxes and cylindrical bearings are employed.

By locating the main bearings for the drum approximately as shown perfect lubrication can be attained, with resulting durability.

It is evident that various changes, variations, and modifications might be resorted to without departing from the spirit and scope of my invention as defined by the claims and hence I do not wish to limit myself to the exact disclosures hereof.

What I claim is:—

1. A cutting-off machine head comprising an annular box forming an oil receptacle and composed of ring-like transverse sections removably secured together with their inner side faces adjoining, and a rotary hollow drum provided with and driving an internal cutter disk, said drum rotating in and carried by said box and extending longitudinally therethrough and formed with an enlarged exterior driving gear inclosed by said box and traveling through said receptacle.

2. A cutting-off machine head comprising an annular hollow box composed of transverse annular sections removably secured together side by side, and a hollow rotary cutter disk drum mounted in and extending centrally through said box and provided with exterior driven means.

3. A cutting-off machine head comprising a hollow annular box, and a hollow rotary cutter disk drum mounted therein and having cylindrical circumferential portions and an exterior driving gear between said cylindrical portions and inclosed by said box, said box having end walls around said cylindrical portions of said drum, said box and drum providing main drum bearings of greater diameter than and removed from said cylindrical portions.

4. A cutting-off machine head comprising an annular hollow box providing main bearings for the cutter disk drum, and a hollow rotary cutter disk drum extending through and mounted in said box and provided with driving means, said drum having circumferential cylindrical end portions formed with series of annular oil collecting and slinging grooves.

5. A cutting off machine head comprising a hollow annular box, and a rotary hollow cutter-disk drum having a cutter disk secured thereto and spanning the same, said drum extending through and rotating in said box and formed intermediate its ends with an exterior driving gear, said box providing main bearings for said drum, the opposite end portions of said drum beyond said bearings having exterior cylindrical surfaces and intervening oil collecting and slinging grooves, said box providing cylindrical edges receiving said surfaces of the drum to form oil-retaining and water-excluding running joints interposed between the main bearings and the outer end edges of the drum, said box also providing annular oil collecting chambers around said slinging grooves and interposed between said cylindrical edges.

6. A cutting-off machine head comprising a hollow annular box composed of transverse annular sections fitting together at their outer edge portions, bolts passing through said edge portions and removably securing the sections together, a rotary hollow cutter disk drum extending through and mounted in said box and having an exterior driving gear arranged between said sections and inclosed within said box, a driving pinion for said gear arranged in said box and provided with a driving shaft, said box forming oil chambers around said drum at opposite side faces of said gear and fitting the drum to form running joints therewith, said box forming the main bearing for the drum between the box and said gear.

7. A cutting-off machine head comprising a hollow annular box, and a rotary hollow cutter disk drum mounted therein and formed intermediate its length with an annular radially projecting portion, the main bearing for the drum being arranged between the box and said radially projecting portion, said drum being provided with driving means.

8. A cutting-off machine head comprising a box, and a rotary hollow cutter disk drum mounted therein and extending therethrough and having circumferential cylindrical portions surrounded by said box and an exterior driving gear between said cylindrical portions and arranged within the box and having annular side bearing faces, said box providing annular side bearing faces to coöperate with said bearing faces of the gear to form the main bearing for the drum.

9. A cutting-off machine head comprising an annular hollow box, and a hollow rotary drum extending therethrough and mounted therein and provided with driving means within the box, said drum having an annular conical bearing surface, and said box providing drum bearing surfaces, one of said surfaces of the box formed by an adjustable bearing ring.

10. A cutting-off machine head comprising a hollow annular box forming an oil receptacle, and a rotary hollow cutter disk drum mounted in said box and provided with an exterior driving gear inclosed in the box and traveling through said receptacle and provided with annular side bearing surfaces, said box provided with corresponding side bearing surfaces to coöperate with said surfaces of the gear and form the main bearing for the drum.

11. A cutting-off machine head comprising a hollow annular box, and a rotary hollow cutter disk drum mounted therein and having cylindrical circumferential portions circumferentially engaged by the walls of said box, said walls of the box forming annular oil chambers open to and around said portions of the drum, said drum provided with an exterior peripherally toothed driving gear, inclosed by said box and provided with side bearing surfaces, said box provided with corresponding side bearing faces coöperating with said surfaces of the gear to form the main bearing of the drum, one of said faces of the box being formed by a bearing ring adjustable bodily in the box in a direction parallel to the axis of the drum.

12. A cutting-off machine head comprising an annular hollow box, and a hollow rotary cutter disk drum extending through and mounted in said box and provided with driving gearing inclosed within the box, said box and drum provided with conical annular bearing surfaces forming the main bearing for the drum, one of said surfaces being formed by a bearing ring bodily adjustable in the box in a direction parallel to the axis of rotation of the drum and provided with adjusting means accessible at the exterior of the box.

13. A cutting-off machine head comprising an annular hollow box, and a rotary hollow cutter disk drum mounted in the box and having cylindrical circumferential portions surrounded by and fitting the end walls of the box, said box walls forming annular oil chambers around said portions of the drum and running joints to retain the oil in said chambers, said drum provided with an exterior driving gear of enlarged diameter with respect to said cylindrical portions of the drum, said box forming an oil receptacle through which said gear travels and inclosing said gear, the main bearing for the drum being of enlarged diameter with respect to said cylindrical portions and being formed by engaging side faces of the gear and box.

14. A cutting-off machine head comprising an anular hollow box composed of ring-line transverse sections secured together with their inner side faces adjoining and forming an annular chamber between said inner side faces at its lower portion constituting an oil receptacle, and a rotary hollow cutter disk drum mounted in and extending through said box and having circumferential cylindrical portions fitted within and surrounded by the end walls of said box sections and provided with an intermediate exterior driving gear arranged between the inner side faces of said box sections and located in said annular chamber, and provided with a driving pinion arranged in said annular chamber and mounted in and carried by said box sections.

15. A cutting-off machine head comprising an annular hollow box composed of ring-like transverse sections secured together with their inner side faces adjoining and forming an annular chamber between said inner side faces at its lower portion constituting an oil receptacle, and a rotary hollow cutter disk drum mounted in and extending through said box and having circumferential cylindrical portions fitted within and surrounded by the end walls of said box sections and provided with an intermediate exterior driving gear arranged between the inner side faces of said box sections and located in said annular chamber, said inner side faces of the box sections having annular bearing surfaces engaging corresponding annular side surfaces of said gear, certain of said surfaces being conical to form the main bearing for the drum and to center the drum within the box.

16. A cutting-off machine head comprising a hollow box forming an internal annular chamber, and a rotary hollow cutter disk drum mounted in said box and provided with an exterior annular portion extending into said chamber and inclosed within the box and provided with side bearing surfaces, said box internally provided with corresponding side bearing surfaces engaging said surfaces of said annular portion, certain of said surfaces being conical to center the drum within the box, one of said surfaces of the box being formed by a bearing ring adjustable longitudinally within the box in a direction parallel with the axis of rotation of the drum and provided with adjusting means.

17. A cutting-off machine head comprising an annular box forming an internal annular chamber adapted to contain oil, and a hollow rotary cutter disk drum mounted in and extending through the box and provided intermediate its ends with an exterior driving gear inclosed by the box and arranged in said chamber, the box and gear providing annular opposite side bearing surfaces forming the main bearing for the drum and open for flow of oil thereto from said chamber and from the rim of the gear, certain of said bearing surfaces being conical and concentrically arranged one within the other, said bearing surfaces comprising a bearing ring bodily adjustable within the box in a direction parallel to the axis of rotation of the drum.

18. A cutting-off machine head comprising an annular hollow box, a hollow rotary cutter disk drum mounted therein, said drum provided with an exterior driving gear within the box and having side bearing faces engaging corresponding surfaces within the box, one of said bearing faces being conical, bearing bushings extending into the outer portion of the box, a pinion shaft mounted in said bushings, a pinion driven by said shaft and arranged in the box and meshing with said gear.

19. A cutting-off machine head comprising an annular hollow box forming an internal annular chamber adapted to contain oil, a hollow rotary cutter disk drum mounted in the box and provided with an exterior driving gear inclosed in the box and located in said chamber, a pinion shaft extending through said chamber and the outer portion of the box and provided with a pinion in said chamber and meshing with said gear, and bearings for said pinion shaft having pockets to receive oil carried up by said pinion and passages leading from the pinion shaft back to said chamber.

20. A cutting-off machine head comprising an annular hollow box, and a hollow rotary cutter disk drum mounted in and extending through said box and provided with driving means arranged in said box, a cutter disk removably fitting one end of the drum and spanning the same, a clamping ring fitting the vertical outer face of said disk and provided with a surrounding annular radially projecting liquid slinging edge, and means for removably securing the ring and disk to the drum end.

21. A cutting-off machine head comprising an annular box, and a hollow rotary cutter disk drum mounted therein and formed with an exterior annular radially extending portion at its outer periphery having spur gear teeth to mesh with drum rotating means, said drum and box provided with drum centering and radial thrust sustaining annular side bearing surfaces and a bearing ring adjustable within the box in a direction parallel to the axis of rotation of the drum.

22. A cutting off machine head comprising an annular hollow box, a hollow rotary cutter disk drum mounted therein, said drum provided with an exterior driving gear integral therewith and inclosed within the box and having side bearing faces engaging corresponding surfaces within the box, one of said bearing faces being conical.

23. A cutting off machine head comprising an annular case, and a rotary saw-blade drum supported therein and provided with a radially projecting member inclosed and rotating within said case, side faces of said case and member providing drum centering and radial thrust receiving bearings of greater diameter than the drum.

24. A cutting off machine head comprising a hollow box, and a hollow rotary cutter disk drum rotating therein and extending therethrough and provided with and spanned by a cutter disk having a central work receiving opening, said box and drum providing main bearings within the box for said drum and comprising an annular bearing adjusting member adjustable longitudinally of the axis of rotation of the drum, said main bearings comprising a conical side-surface rotating with the drum and a corresponding conical side-surface of the box.

25. A cutting off machine head comprising an annular case, and a rotary saw-blade drum supported therein and provided with a radially projecting member inclosed and rotating within said case, side faces of said case and member providing drum centering and radial thrust receiving bearings of greater diameter than the drum, one of said side faces of the case being adjustable longitudinally of the axis of rotation of the drum.

26. A cutting off machine head comprising a box consisting of annular end sections, and a rotary hollow cutter-disk carrying drum extending through and rotating in and carried by said sections and provided with an exterior driving gear arranged between said sections.

27. A cutting-off machine head comprising an annular case, and a rotary drum extending therethrough and mounted therein and having a central opening and provided with a saw blade spanning said opening and having a central-work receiving opening, said drum being provided with exterior driving means inclosed within said case, said case and drum providing opposite side main bearings for the drum, one of said bearings comprising an annular V-groove and a corresponding annular V-rib fitting in said groove.

28. A cutting-off machine head comprising an annular case, and a rotary hollow saw-blade drum mounted in said case and having an exterior drum driving gear, opposite side faces of the drum and case providing radial-and-longitudinal-thrust sustaining main bearings for said drum comprising means adjustable longitudinally of the axis of rotation to adjust said bearings and an annular V-groove in one of said side faces and a corresponding annular V-rib on an opposing side face and fitting in said groove.

29. A cutting off machine head comprising an annular case, and a rotary hollow saw-blade drum mounted therein and comprising an exterior annular portion between opposite inner side faces of said case, the opposite side faces of the case and said portion of the drum forming longitudinal-and-annular-thrust sustaining bearings for the drum comprising an annular V-groove and a corresponding annular V-rib fitting said groove.

30. A cutting off machine head comprising a case, and a hollow rotary saw-blade drum mounted therein and having an exterior driving gear inclosed within the case, said drum and casing providing main longitudinal and radial thrust-sustaining bearings for the drum comprising an annular groove and an opposing corresponding annular V-rib fitting therein.

In testimony whereof I affix my signature in presence of two witnesses.

GEORGE GORTON.

Witnesses:
C. ELLANDSON,
EARL S. GERE.

---

Copies of this patent may be obtained for five cents each, by addressing the "Commissioner of Patents, Washington, D. C."